H. E. CARY.
DISH ATTACHMENT.
APPLICATION FILED SEPT. 22, 1915.

1,229,226. Patented June 12, 1917.

INVENTOR
Harry E. Cary

WITNESSES
Guy M. Spring
Wm. Webster Downing

BY Richard Owen
ATTORNEY

UNITED STATES PATENT OFFICE.

HARRY E. CARY, OF OAKLAND, CALIFORNIA.

DISH ATTACHMENT.

1,229,226.   Specification of Letters Patent.   Patented June 12, 1917.

Application filed September 22, 1915. Serial No. 52,040.

*To all whom it may concern:*

Be it known that I, HARRY E. CARY, a citizen of the United States, residing at Oakland, in the county of Alameda and State of California, have invented certain new and useful Improvements in Dish Attachments, of which the following is a specification.

My invention relates to dishes and more particularly to an artichoke attachment for dishes.

The primary object of my invention resides in the provision of an attachment for removable association with a plate or saucer of the usual type for holding artichoke or other somewhat similar esculent or edible thereon in a manner that it may be conveniently served.

Another object of my invention resides in the provision of an improved means carried by the attachment for receiving a quantity of dressing that can be used on the artichoke.

A further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

Figure 1:
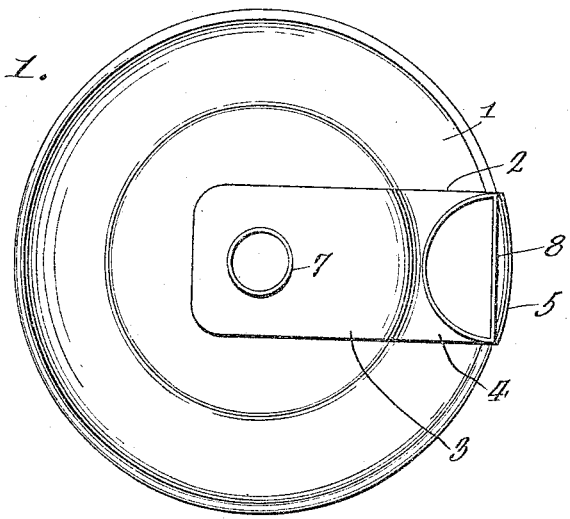
Figure 1 is a top plan view of my invention applied to a plate.
Figure 2:
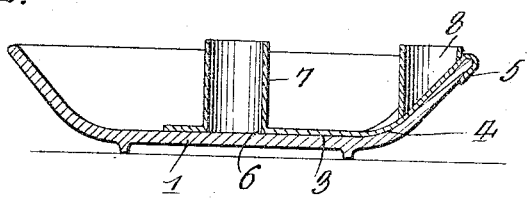
Fig. 2 is a sectional view of my invention applied to a plate in section.
Figure 3:
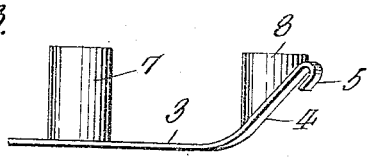
Fig. 3 is a side elevational view of my invention.

Referring more particularly to the drawings in which similar reference numerals designate like or corresponding parts throughout the different views, I provide a dish 1 which may be either a plate or a saucer and have removably associated therewith my improved attachment generally designated by the numeral 2. The attachment in this instance consists essentially of a rectangular body 3, in plan, formed preferably of any desirable metal, having one end thereof bent and extended upwardly and curved transversely as indicated by the numeral 4 so that the body will conform to the side and bottom of the dish with which it is associated, the extreme terminal of the upstanding end being bent upon itself to provide a transversely curved flange 5 which facilitates the removable association of the device with the dish. The main or straight portion of the body is provided adjacent its ends with an opening 6 which is incidentally arranged in the center of the dish and about which opening and integrally formed with the upper surface of the body is a vertically extending collar 7, which constitutes a socket for receiving the stem of an artichoke or other similar edible in a manner that can be conveniently served. It is of course obvious that other artichoke can be placed on the dish to be later broken open and set up in the collar after one has been eaten, if so desired. The upper edge of the collar is preferably arranged in a plane slightly above the plane of the upper edge of the dish so that a suitable support for the edible is provided. Formed integral with the upper surface of the upstanding portion 4 is a pocket 8 desirably semicircular in cross section as clearly illustrated in Fig. 1 of the accompanying drawings so that a spoon, not shown, may be readily inserted therein for removing dressing therefrom, which dressing is for seasoning the artichoke.

Although I have shown and described the preferred embodiment of my invention, I desire to be understood that I am not to be limited to the exact details shown, however, I desire that great stress be laid upon the arrangement of the attachment for removable association with a dish for supporting an artichoke or other similar edible in an upright position so that it can be conveniently served. Attention is also directed to the fact that these attachments may be made in various sizes for association with various dishes, the changes that would occur in the structure merely amounting to a matter of degree.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the preferred embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent, is:—

An attachment for holding artichoke on dishes including a relatively flat body formed from a single strip of resilient metal engageable with the center of the dish and having one end portion bent upwardly at an obtuse angle thereto and curved transversely to conform to the inside of the dish, a flange for engaging the edge of the dish formed by bending the upstanding end upon itself and curving it transversely into uniformly spaced relation with the under surface of the upstanding portion, the flat portion of the body being provided with an opening, a vertically arranged stem receiving collar formed with the body about the opening, and a pocket formed on the upper surface of the upstanding portion for receiving dressing adapted to be used on the artichoke.

In testimony whereof I affix my signature in presence of two witnesses.

HARRY E. CARY.

Witnesses:
O. R. WOOD,
GOLA M. WOOD.

Copies of this patent may be obtained for five cents each, by addressing the "Commissioner of Patents, Washington, D. C."